3,282,402
CONVEYOR CHAIN AND SUPPORT THEREFOR
Walter D. Ayres, Jr., Oaklawn, Ill., assignor to B. H. Bunn Company, Chicago, Ill., a corporation of Illinois
Original application May 6, 1963, Ser. No. 278,053, now Patent No. 3,189,163, dated June 15, 1965. Divided and this application June 1, 1965, Ser. No. 460,033
7 Claims. (Cl. 198—189)

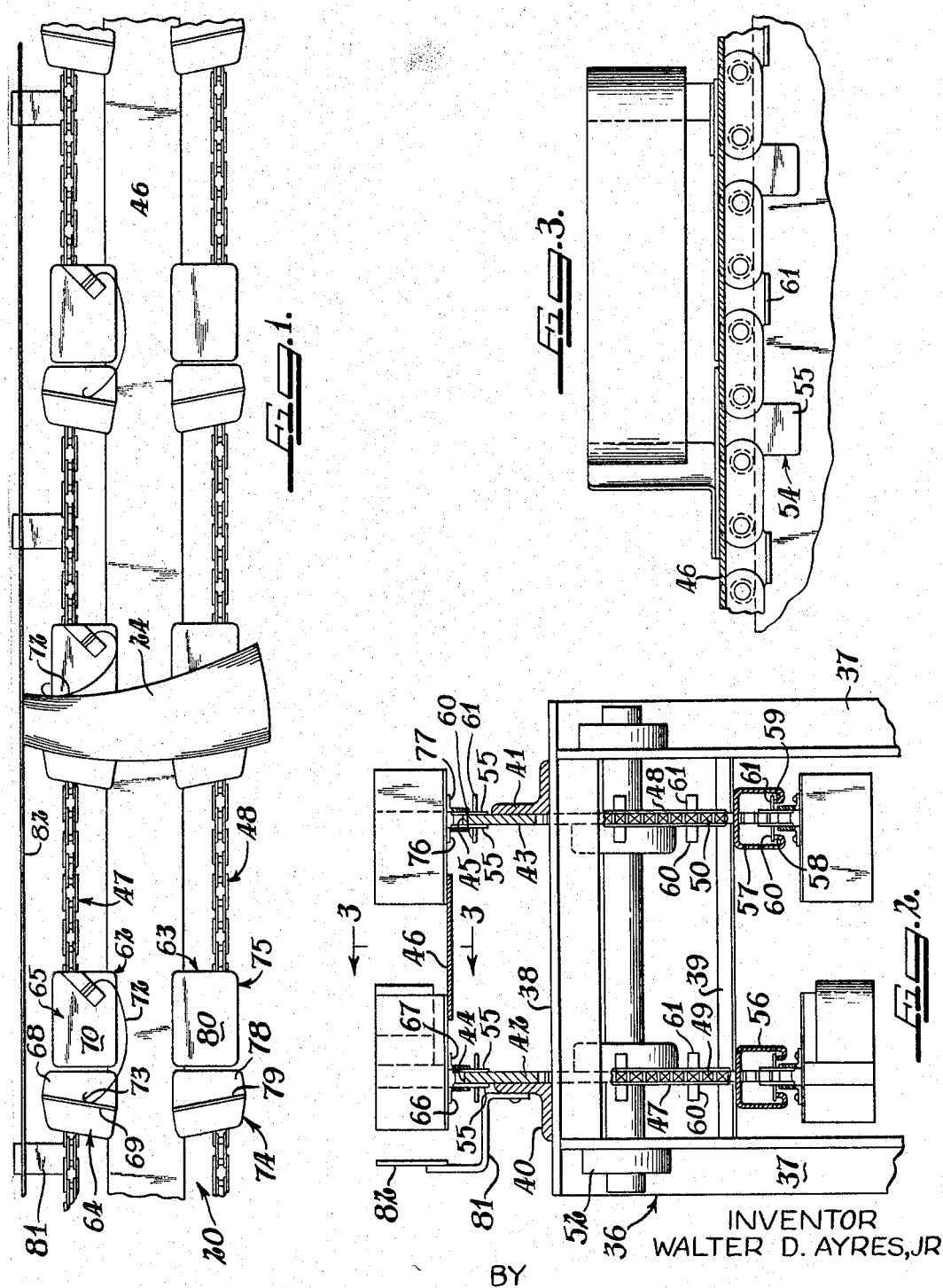

This application is a division of my co-pending application Ser. No. 278,053, filed May 6, 1963, now Pat. No. 3,189,163, for Apparatus for Tying Moving Bundles.

This invention relates to a conveyor chain construction and to a support therefor.

Chain-type conveyors are generally driven by sprockets and have secured to or made part of the links thereof supports for articles to be moved by said conveyor. Where the conveyor is horizontal, the return flight is subjected to the force of gravity over its entire length and hence requires a support to avoid sag and possible undesirable swinging movement.

An object of this invention is the provision of a simple, readily constructed means for supporting the return flight of a conveyor.

Another object of this invention is to provide a conveyor chain which is constructed to slide along the top of a rail in one direction and is supported in a readily available box structural member in its return direction, with article-carrying means secured to and movable with the conveyor in both directions.

As a more specific object, this invention has within its purview the provision of a conveyor chain constructed to have three forms of links, the first form being designed to embrace and retain between them a rail on which the chain rides and is supported during an article-carrying movement of the chain; the second form extending laterally and serving to support the chain on its return flight; and the third form extending upwardly and laterally to support article-carrying clamps or the like.

These and other objects and features of this invention will become apparent from the following detailed description of a preferred embodiment when taken together with the accompanying drawings in which FIG. 1 is a schematic plan view of a conveyorized apparatus for tying bundles of mail which incorporates a chain drive made in accordance with this invention;

FIG. 2 is a fragmentary end elevational view in section, on an enlarged scale, of a conveyor such as that shown in FIG. 1; and FIG. 3 is a fragmentary front elevational view on a still larger scale, of the conveyor of FIG. 1.

Referring now to the drawings for a detailed description of the invention, there is shown a substantially horizontally disposed conveyor 20 which may be used in a post office in conjunction with tying machines for conveying bundles of mail from sorting stations to the tying machines (not shown). Similarly oriented envelopes are assembled in bundles such as are shown at 24 and laid upon their long edges into clamping devices, hereinafter to be described, affixed to and carried by conveyor 20.

The conveyor 20 is comprised of a frame 36, which includes a series of spaced upright angle iron supports 37 disposed in pairs along said conveyor, said upright angle irons 37 supporting upper cross plates 38 and lower transversely disposed angle irons 39. To the upper cross plates 38 are secured spaced longitudinal angle irons 40 and 41, each of which supports a track 42 and 43, respectively. Said tracks are in the form of continuous plates having upper surfaces 44 and 45 for supporting the moving elements of the conveyor. Also suitably supported from frame 36, by means not shown, is a longitudinal plate 46 which provides a support for bundles of mail moved by the conveyor and prevents said bundles, or the elements thereof, from falling through the moving conveyor into the framework 36.

The moving portion of conveyor 20 is comprised of a pair of endless chains 47 and 48, which are disposed parallel to one another and pass over sprockets 49 and 50 disposed on the left hand end of the conveyor as viewed in FIG. 1, and mounted on a common shaft 51 supported in spaced bearings 52 and 53 on vertical frame supports 37.

Certain of the links of the chains 47 and 48, such as, for example, every fourth link, are of T form as shown in FIG. 3, the tail 55 of the T overlying the sides of the tracks 42 and 43 and thus constraining the chain to ride on, and follow, said tracks. It is contemplated, as shown in FIG. 2, that the tails of the T links on two sides of a chain will embrace a track and thus prevent the chain from moving laterally with respect to said track.

In view of the long span of the conveyor, and, therefore, of the relatively long flight of the chain which is passed underneath the load-carrying flight of the conveyor, suitable support for said chain is desirable to prevent it from swinging too low and possibly becoming misaligned with the sprockets at the beginning end (left hand end as viewed in FIG. 1) of the conveyor. The requisite support for the return flight of the conveyor is provided by longitudinally disposed, box-type structural members 56 and 57 which are spaced to lie directly below tracks 42 and 43, and are secured to transverse angle irons 39. The bottom surface of each of the structural members 56 and 57 is slotted and the ends of the slot are then bent inwardly of the member as shown at 58 and 59 to form spaced longitudinal rails. The links of chains 47 and 48 intermediate those having the T links, such as 54, are also provided with T links, but the tails of the T are bent outwardly of the chain, as shown at 60 and 61, to overlie and ride upon the inwardly turned ends 58 and 59 of the structural member. The laterally turned tails 60 and 61 of the links of the chains 47 and 48 therefore serve to support the chains and their attached letter-holding clamps from the box structural members while said chains are returning to the entrance or beginning end of the conveyor 20.

The clamping devices are arranged in pairs 62 and 63, the devices 62 all being disposed at stated intervals on chain 47 and the devices 63 being disposed in aligned relation to the devices 62 on chain 48. Inasmuch as chains 47 and 48 are driven from sprockets mounted on the same shaft and rotatable, therefore, at precisely the same speed, clamping devices 62 and 63 will always be correctly aligned.

The clamping devices 62 are comprised of two parts 64 and 65, each mounted on horizontally extending portions 66 and 67, of certain of the links of chain 47. The parts 64 and 65 are mounted on different links so that as the chain passes over a sprocket, said parts can move independently and can separate as required by the geometry of the rotating sprocket and chain. This separation is utilized to release a bundle as it leaves conveyor 20. Part 64 has a horizontally disposed plate 68 and a vertically disposed plate 69, said horizontally disposed plate 68 serving as a support for the ends of the bundle and the vertically disposed plate 69 serving as an abutment against which the bundle is to be compressed.

Part 65 has a horizontal plate 70 to the forward portion of which is secured a bracket 71 to which, in turn, is secured a vertically disposed leaf spring 72 curved inwardly of the conveyor and designed to have its curve end 73 bear against vertical plate 69 on part 64.

Clamping device 63 is similarly comprised of two parts 74 and 75 which are secured to chain 48 through horizontally disposed portions 76 and 77 on separate links of said chain. Parts 74 and 75 are independent of one another, part 74 being comprised of a horizontal plate 78 and a vertical plate 79, and part 75 being comprised of a single substantially rectangular plate 80. Horizontal plate 78 serves to support the ends of a bundle, as does also plate 80, and the vertical plate 79 serves as an abutment for a pressure device (not shown), which compacts the ends of the bundle extending over clamp part 63.

In FIG. 1 the bundle 24 is shown held by the clamping device portion 62. It may be observed that leaf spring 72 has been considerably deformed to exert a pressure upon bundle 24 in the direction of the vertical plate 69 to hold one end of the bundle in a compacted condition. The opposite end, that is, the one cooperating with the clamp part 63, is set at this stage uncompressed. The means for compressing this end of the bundle is fully described in my aforesaid application.

Thus each chain 47, 48 is comprised of three forms of links, viz; that form which is T-shaped, with the tails 55 of the T's parallel with one another, a second form in which T-shaped links are used, but the tails 60, 61 are bent at right angles to the plane of the T, and a third form, which resembles the second, but is inverted with respect thereto so that the laterally bent tails 66, 67 or 76, 77 are elevated above the chain. The first form thus embraces a rail 42 or 43 and maintains the chain on the upper surfaces 44, 45 thereof. The second form provides horizontally extending tabs by which the return flight is supported and protected in box structures 56, 57, and the third form provides portions or tabs 66, 67 and 76, 77, to which the load can be secured.

It is understood that the foregoing description is merely illustrative of a preferred embodiment of the invention and that the scope of the invention is not to be limited thereto, but is to be determined by the appended claims.

I claim:

1. In combination, an endless roller chain conveyor, and means for supporting said roller chain, said roller chain being movable in a generally horizontal direction and having an upper load supporting flight and a lower return flight; laterally extending projections on the chain, said supporting means comprising a fixed frame, a hollow member on the frame and having a slot on its under side extending the length thereof, said chain being received in said slot with the laterally extending projections overlying the edges of said slot, whereby to support the lower return flight, a rail on the frame for supporting the load-bearing flight, and vertically extending projections on the sides of the chain and adapted to receive the rail between them to retain the chain on said rail.

2. In combination, an endlss chain conveyor having a load-carrying flight and a return flight, and means for supporting said conveyor, said chain having first, second and third forms of links, said first form being T-shaped, with the tails of the T extending in parallel planes, said second form having a laterally extending tab, article-supporting means secured to said laterally extending tab, and said third form having a laterally extending tab spaced from the first laterally extending tab, a supporting rail for the load-carrying flight of the chain, the tails of the T of the first form retaining the rail between them, and a support for the return flight of the chain, said tabs of the third form sliding upon said return flight support.

3. The combination described in claim 2, said supporting rail for the load-carrying flight of the chain comprising a vertically disposed plate supporting the chain on the upper edge of said plate.

4. The combination described in claim 2, said support for the return flight comprising a slotted structural member of box form, the edge regions of the member defining the slot being turned inwardly, and the laterally extending tab on the third form of links sliding upon said in-turned edge regions of said structural member with the links of said third form extending through said slot.

5. The combination described in claim 2, said support for the return flight comprising a horizontally disposed box section structural member having a longitudinal slot in its lowermost side, said third form having additional laterally extending tabs which extend in a direction opposite to that of the first-mentioned laterally extending tabs on the third form, said third form tabs passing within, and sliding upon the lowermost side of, the structural member, and said third form links extending through said slot to the exterior of said structural member.

6. In combination, an endless chain conveyor, and means for supporting said conveyor, said conveyor being movable in a generally horizontal direction and having an upper load-bearing flight and a lower return flight; lateral projections on the chain, said supporting means comprising a fixed frame, a hollow member on the frame and having a slot on its under side extending the length thereof, said chain being received in said slot with the lateral projections overlying the edges of said slot whereby to support the lower return flight, a rail on the frame for supporting the load-bearing flight, and projections on the sides of the chain and adapted to receive the rail between them to retain the chain on said rail, said chain being comprised of three types of links, the lateral projections being formed on one of said types of links, the projections on the sides of the chain to receive the rail between them being formed on another of said types of links, and support means for articles to be carried by the conveyor on the third of said types of links.

7. In combination, an endless chain conveyor, and means for supporting said conveyor, said conveyor being movable in a generally horizontal direction and having an upper load-bearing flight and a lower return flight; lateral projections on the chain, said supporting means comprising a fixed frame, a hollow member on the frame and having a slot on its under side extending the length thereof, said chain being received in said slot with the lateral projections overlying the edges of said slot whereby to support the lower return flight, a rail on the frame for supporting the load-bearing flight, projections on the sides of the chain and adapted to receive the rail between them to retain the chain on said rail, and load-supporting plates on said chain conveyor, said chain being comprised of three types of links, the lateral projections being formed on one of said types, the projections on the sides of the chain to receive the rail between them being formed on another of said types, and lateral projections on the third of said types, said load-supporting plates being secured to the lateral projections of the third of said types.

References Cited by the Examiner

UNITED STATES PATENTS

| | | | |
|---|---|---|---|
| 1,902,873 | 3/1933 | Marone | 198—189 |
| 2,256,005 | 9/1941 | Wood | 198—137 |
| 2,731,132 | 1/1956 | Socke | 198—174 |
| 3,004,498 | 10/1961 | Parker | 198—177 |

EVON C. BLUNK, *Primary Examiner.*

RICHARD E. AEGERTER, *Examiner.*